May 10, 1960     K. C. ADAMS ET AL     2,935,889
LUBRICATION OF TRANSMISSION CLUTCH DISKS
Filed Nov. 12, 1957     2 Sheets-Sheet 2
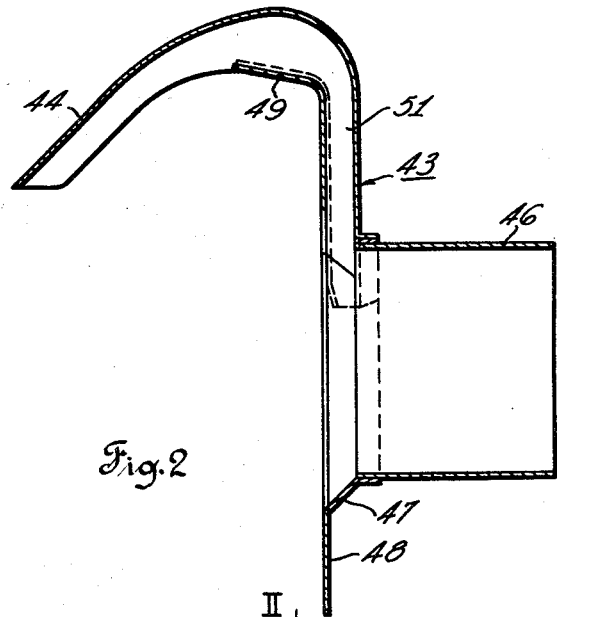
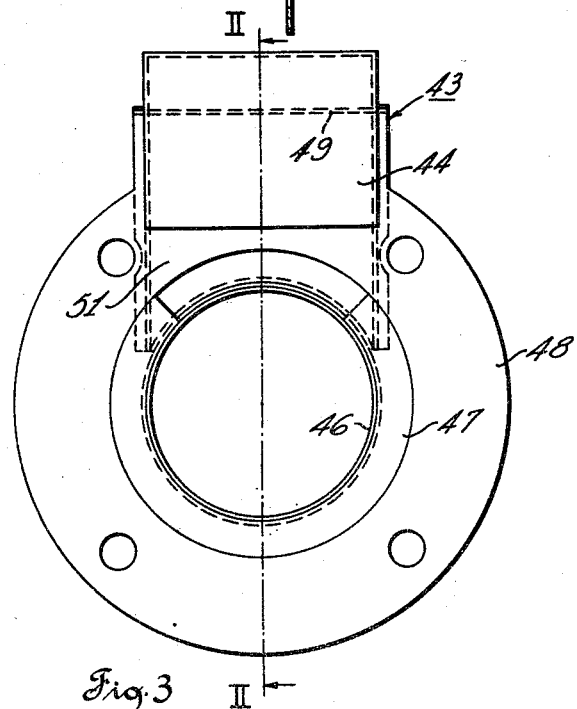

United States Patent Office 2,935,889
Patented May 10, 1960

2,935,889

LUBRICATION OF TRANSMISSION CLUTCH DISKS

Kenneth C. Adams and Robert G. Honeyager, Milwaukee, Wis., assignors to Allis-Chalmers Manufacturing Company, Milwaukee, Wis.

Application November 12, 1957, Serial No. 695,699

6 Claims. (Cl. 74—467)

This invention pertains to lubricating systems in general and more particularly to a nonpressurized lubricating system for a heavy duty disk type friction clutch.

In friction clutches, it is necessary to devise a means of dissipating the heat generated due to the friction between the contacting surfaces of the clutch. At best, this heat results in low operating efficiency and, in some instances, causes the friction surfaces to freeze together. Wet clutches have been devised wherein the clutch disks are lubricated to transfer the heat into the oil sump where it is dissipated into the atmosphere. The simplest way to deliver a lubricating fluid to the frictional surfaces of the disk clutch is to submerge the clutch in a lubricating oil. This, however, results in churning which creates additional heat with a resulting power loss and is more detrimental than the cooling effect of the lubricant. If the clutch rotates in a housing only partially filled with a lubricating oil, it has been found that the foaming action is not sufficient to counteract the advantageous cooling of the friction disks due to the splashing of the oil. In some cases, this type of lubrication is sufficient, however, where heavy loads are encountered and a heavy duty friction clutch is employed, it is necessary to supplement splashed lubrication by delivering additional fluid to the friction disks. Since the clutch compartment is not completely filled with oil, it is necessary to raise the oil from a lower level to the higher level of the friction disks. This can be accomplished by providing the clutch with a pump and developing a pressurized system of lubrication. This, however, is considerably expensive when the pump and seals are considered.

Applicants have devised a combination consisting of a novel arrangement of elements resulting in the delivery of a quantity of lubricating oil which is sufficient to cool the clutch disks. By utilizing the motivating forces present in the system, applicants are able to deliver a sufficient quantity of lubricating oil to a heavy duty clutch so that a pressurized lubricating system is not necessary.

It is an object of the invention to provide a friction clutch with a baffle and tube arrangement wherein oil contacting the baffle is directed to the tube through which it is moved by means of a coil spring to the clutch disks.

A further object is to provide a lubricating system of the hereinbefore mentioned type wherein the tube also receives oil from an antifriction bearing.

Another object of the invention is to provide a system of oil passages through relatively rotating clutch hubs so as to insure sufficient cooling of two sets of clutch disks.

The foregoing and other objects and advantages of the invention will become more fully apparent from the following description of the invention shown in the accompanying drawings. Referring to the drawings, in which like reference characters designate the same or similar parts of the various views;

Fig. 2 is a cross section taken along the line II—II in Fig. 3; and

Fig. 3 is an end view of the baffle and tube removed from the clutch.

Figure 1:
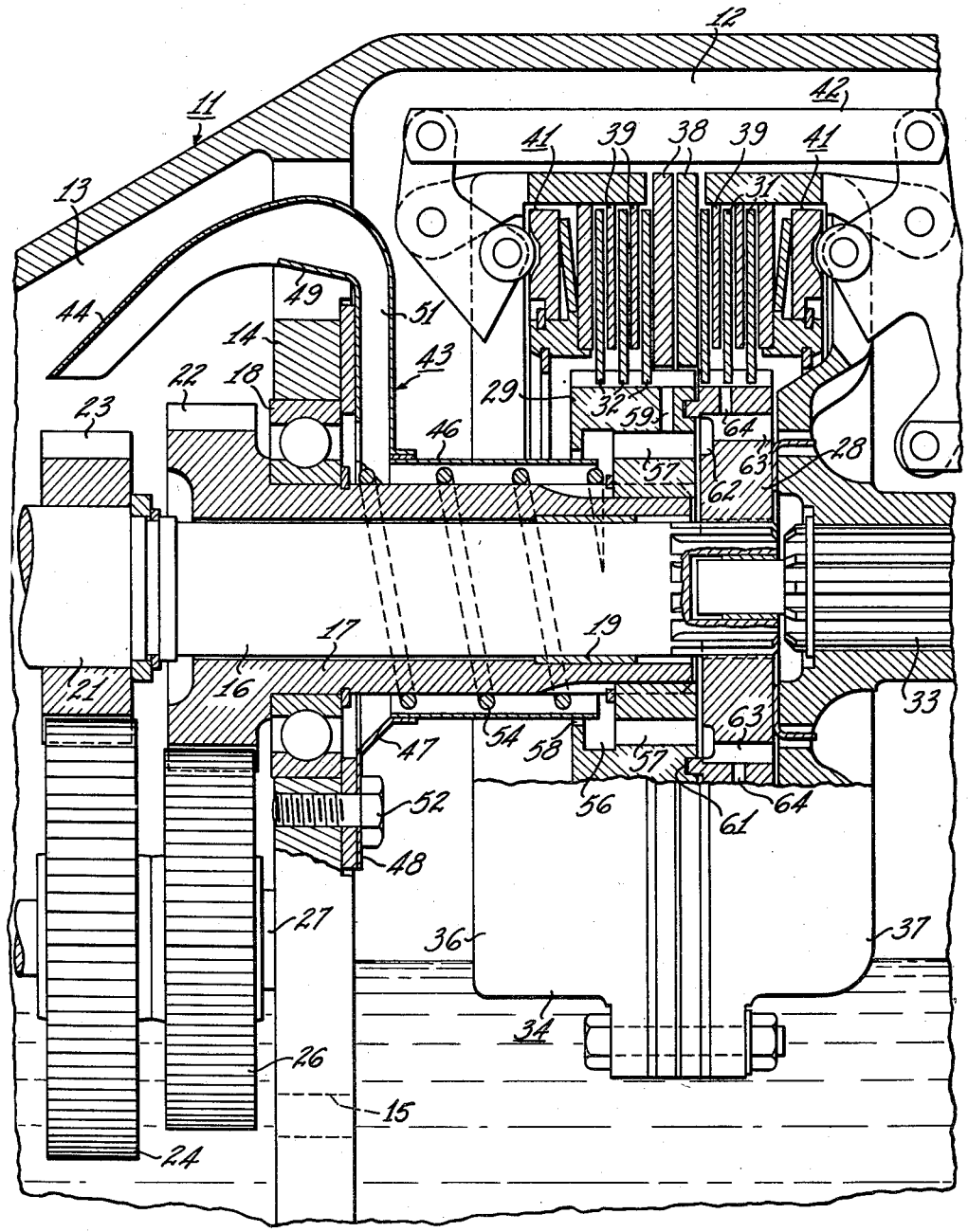
Fig. 1 is a partial vertical sectional view through a clutch mechanism made in accordance with the invention.

As shown in Fig. 1, a torque transmitting mechanism is rotatably contained in a housing 11. The housing is divided into a clutch chamber 12 and a gear chamber 13 by a vertically extending bearing support wall 14. A passageway 15 through the lower portion of the support wall 14 allows the free flow of oil in the housing 11 between the gear and clutch chambers. An input element consisting of a drive shaft 16 and a quill shaft 17 is held for rotation within the housing due to a journal connection between quill shaft 17 and wall 14 through ball bearing 18. Drive shaft 16 is rotatably held within the quill shaft by bearing 19. The input element extends from gear chamber 13 into the clutch chamber. Drive shaft 16 is operably connected by means of a coupling to an engine shaft 21 and is driven thereby at engine speed. Integrally joined to that end of quill shaft 17 which extends into the gear chamber 13 is a spur gear 22. Quill shaft 17 is driven at less than engine speed due to an underdrive gear set composed of gear 23 on engine shaft 21 and gears 24 and 26 on countershaft 27. Hub 28 is splined to shaft 16 and hub 29 is is splined to quill shaft 17. Clutch disks 31 and clutch disks 32 are axially slidably positioned on hubs 28 and 29 respectively. The disks are notched internally forming an internal ring of teeth which mate with the teeth of the hubs. This arrangement allows the disks to be positioned on the hubs in any axial position and also provides a positive drive for transmitting torque.

Clutch shaft 33 is journaled in housing 11 and extends into the clutch chamber 12. This shaft is coaxial with and has its forward end journaled in the rearward end of drive shaft 16. Mounted on the forward portion of clutch shaft 33 for rotation therewith is a clutch drum 34 including front and rear carrier plates 36 and 37, respectively. These plates are rigidly fastened together by a series of cap screws preferably equally spaced around the periphery of the plates. A shaft extension of the rear carrier plate is spline connected to the clutch shaft providing a torque transmitting connection between the clutch drum and the shaft 33.

Fastened between the front and rear carrier plates and rigidly held together by the cap screws are two identical backing plates 38. These plates extend radially inward from the periphery of the carrier plates and rotate therewith. Friction disks 39 are connected in torque transmitting relation to clutch drum 34 in any conventional manner and are positioned alternately between the clutch disks. A pressure plate assembly generally designated 41 selectively brings adjacent clutch disks and friction disks into torque transmitting engagement. Actuation of the pressure plate assemblies is provided by an over-center linkage generally designated 42.

It should be obvious at this point that the clutch drum 34 rotates within the clutch chamber 12. As is shown in Fig. 1, the oil level is such that the lower portion of the clutch drum contacts the oil as it rotates. This results in a foaming action with the necessary heat loss, however, the amount of cooling of the clutch disks due to the bathing of the clutch is considered of greater advantage than the amount of energy loss. The amount of cooling derived from this bathing is not sufficient, however, and without further lubrication the clutch disks would show considerable distortion and wear after a short period of use. To overcome this, applicants have devised a novel nonpressurized system for delivering the oil to the clutch disks in sufficient quantities to adequately cool the clutch.

Referring to Figs. 2 and 3, an oil collecting means generally designated 43 is composed of a bafle 44 and a tube 46 having a peripheral flange 47 thereon. The flange tapers outwardly away from the tube and is then turned over forming a flat mounting surface 48. The baffle 44 is channel shaped in cross section and is connected to the tube 46 so that the legs of the channel abut the flat mounting surface 48 and the base of the channel abuts the periphery of the tube along the line where the flange tapers outwardly from the tube. In this manner, the baffle and the mounting surface form a rectangular passageway 51. That portion of the flange between the legs of the baffle is cut out providing an opening from the tube to the passageway 51. It should be noted that the mounting surface above the cut out portion extends upwardly and is then bent over providing a mounting ledge 49 for the upper portion of the baffle 44. The passageway 51 extends from the tube 46 to the end of ledge 49.

As shown in Fig. 1, the flat mounting surface 48 is connected to the bearing support wall 14 by four cap screws 52. The tube extends along shaft 16 and the baffle extends upward and through an opening in the wall into gear chamber 13 and overlies the gears 22 and 23. Because the flange is tapered outwardly, clearance is provided between the wall 14 and the tube 46 and since the tapered part of the flange between the legs of the channel is cut out, the tube 46 is in oil receiving communication with the gear chamber 13 through the passageway 51. Gears 24 and 26 on countershaft 27 are partially submerged in oil and upon rotation carry oil to gears 22 and 23. These gears in turn throw the oil upward where it contacts the curved portion of baffle 44. It should be noted that the ledge 49 does not extend over the gear 22 so that the oil thrown upward by this gear has an opportunity to enter the passageway 51. As the oil contacts the baffle, it is directed to the right where it is caught by the ledge 49 and thereby follows the passageway 51 into the tube 46. Once in the tube, the oil flows to the right to the clutch hub 29.

Applicants were aware that a portion of the oil thrown against baffle 44 dropped down before it was caught by the ledge 49. Some of this oil follows the surface of wall 14 and lubricates the ball bearing 18. It is known that oil contacting the balls of a ball bearing is squirted through the bearing due to the rolling action between the balls and the bearing race. Applicants believed that this oil could be utilized to add to the amount of oil delivered to the clutch hub 29. As is shown in Fig. 1 of the drawings, no seal is provided for the ball bearing and the gear compartment 13 is open to the tube 46. Some of the oil which is not caught by the ledge 49 passes through the ball bearing into the tube. Once in the tube, this oil and the oil delivered by passageway 51 is augered along the tube by a coil spring 54. It should be noted that the spring 54 is positioned on the shaft 17 so that the first coil is immediately adjacent wall 14. With this arrangement, the oil from passageway 51 and the upper portion of bearing 18 is moved along the tube as soon as it contacts the first coil.

As shown in Fig. 1, tube 46 extends into a counterbore 56 in hub 29. Since the clutch hub 29 is rotating, centrifugal force throws the oil outward against the outer periphery of the counterbore until a sufficient amount of oil is contained within the counterbore that it will flow along axial metering holes 57. Any number of axial holes can be provided depending upon the quantity of lubricating oil supplied to the counterbore. Applicants have found that for this particular arrangement six metering holes are sufficient. Counterbore 56 has sufficient volume so that it will not overflow through the opening 58 which is necessary for running clearance between hub 29 and tube 46. The oil does not pass through this opening because of the smaller radius of the opening in relation to the center line of shaft 16 as compared to the radius of holes 57 in relation to the center line of shaft 16. Centrifugal force keeps the total quantity of oil beyond opening 58 and this oil moves along holes 57 before the counterbore is filled to this opening.

Angularly spaced around hub 29 are a series of radial passageways 59 one each connecting with an axial hole 57. The radial passageways are axially staggered to deliver oil to different clutch disks. By providing six axial holes and connecting only four of these with the radial passageways, an excessive amount of oil is not delivered to clutch disks 32 so that a sufficient quantity is available for the clutch disks 31.

A labyrinth seal 61 is provided between hubs 28 and 29 which allows only a small amount of oil to seep between the hubs insuring a sufficient amount of oil for the clutch disks 31. The oil which seeps around the labyrinth seal lubricates the backing plates 38. An annular groove 62 in hub 28 mates with the axial holes in hub 29. It should be noted that approximately one-quarter to one-half of this annular groove is radially outward a further distance from the center line of drive shaft 16 than the axial holes 57. Since centrifugal force is continually throwing the lubricating oil outward, when the oil enters annular groove 62, it is forced against its outer periphery and into axial metering holes 63. It should also be noted that these axial holes are a further distance radially from the center line of the drive shaft than is the outer periphery of the annular groove. With this arrangement centrifugal force directs most of the oil into metering hole 63 and only a small amount acts against seal 61. This does not therefore build up excessive pressure against the labyrinth seal. In hub 28 there are only four axial metering holes which are connected to the clutch disks by means of four axially staggered radial passageways 64. After the oil has passed through the clutch disks 31 and 32, it falls down to the oil sump at the bottom of the clutch housing.

With this arrangement applicants have provided a novel inexpensive lubricating system for a disk type friction clutch. By utilizing known elements and combining them in a novel way, applicants have provided a novel lubricating system which delivers sufficient cooling oil to a friction clutch so that a pressurized lubricating system is not required.

What is claimed is:

1. In combination with a torque transmitting mechanism including a housing partially filled with a lubricating oil, a pair of axially aligned shafts journaled for rotation within the housing, a gear set operatively connected to one of the shafts with a portion thereof partially submerged in the lubricating oil whereby oil is splashed upon rotation of said gear set, and a friction clutch operatively connected to the shafts for selective connection of the shafts in torque transmitting relation, said friction clutch being axially spaced from said gear set, a lubricating system for the clutch comprising: a baffle rigidly connected to said housing and having one end overlying said gear set so as to collect the oil splashed by said gear set; a tube secured to the other and relatively lower end of said baffle and encircling said one of said shafts from said gear set to said clutch, said baffle directing oil splashed by said gear set to said tube; a ribbon attached in the form of a coil to the periphery of said one of said shafts for rotation therewith within said tube, said ribbon driving the oil through said tube in the direction of said clutch upon rotation of said shaft; and oil carrying passageways in said friction clutch in fluid communication with said tube to carry the oil to the parts of said friction clutch to be lubricated.

2. A lubricating system for a torque transmitting mechanism comprising in combination: a housing; a support wall dividing said housing into a gear chamber and a clutch chamber; a clutch shaft journaled in said housing and extending into said clutch chamber; a gear shaft axially aligned with said clutch shaft and extending from said gear chamber into said clutch chamber; an antifriction bearing operatively connected to said wall and rotatably supporting said gear shaft, said bearing being open to said gear chamber on one side and said clutch chamber on the other side; a clutch operatively connected to said gear shaft and said clutch shaft for selectively connecting said shafts in torque transmitting relation; a gear set operatively connected to said gear shaft within said gear chamber; a lubricating oil partially filling said housing, said gear set being partially submerged in said oil whereby said lubricating oil is splashed upon rotation of said gear set; an opening provided in said support wall below the level of said lubricating oil to allow the flow of said lubricating oil between said clutch and gear chambers; a tube fastened in oil sealing relation to said wall in surrounding relation to said bearing, said tube surrounding the portion of said gear shaft between said wall and said clutch; a baffle having one end connected in oil transmitting relation to said tube and having its other and relatively higher end overlying said gear set so as to collect the oil splashed by said gear set; and a coil spring of a length substantially equal to the length of said tube carried on said gear shaft for rotation therewith within said tube.

3. In combination with a torque transmitting mechanism including a housing partially filled with oil, a wall dividing the housing into a gear chamber and a clutch chamber there being an opening through said wall below the level of said oil to allow the flow of said oil between said clutch and gear chambers, a clutch shaft journaled in the housing and terminating in the clutch chamber, a gear shaft journaled in the housing and extending from the gear chamber into the clutch chamber in axial alignment with the clutch shaft, a clutch operatively supported on the shafts for selectively connecting the shafts in torque transmitting relation and a gear set operatively connected to the gear shaft within the gear chamber and being partially submerged in said oil whereby said oil is splashed by the rotation of said gear set, a lubricating system comprising: a tube having a diverging flange thereon surrounding said gear shaft within said clutch chamber, said flange being fastened in oil sealing relation to said wall; a baffle having one end connected to said flange in oil transmitting relation to said tube and having its other and relatively higher end overlying said gear set so as to collect the oil splashed by said gear set, said baffle directing the oil splashed by said gear set to said tube; and a coil spring of a length substantially equal to the length of said tube carried on said gear shaft for rotation therewith within said tube.

4. In combination with a two way friction clutch having first and second sets of clutch disks connected for rotation with first and second axially aligned adjacently positioned clutch hubs, respectively, and oil collecting means for delivering oil to said first hub, a lubricating system for carrying the oil to said clutch disks comprising: a counterbore in said first hub in oil receiving communication with said oil collecting means; an annular groove in said second hub, having a greater radius with the axis of said hubs than the radius of said counterbore; axially extending metering holes in said first hub connecting the outer periphery of said counterbore with the inner periphery of said annular groove; axially extending metering holes in said second hub in communication with the outer periphery of said annular groove; an annular labyrinth seal between said first and second hubs, the inner periphery of said seal being a greater radial distance from the axis of the clutch hubs than the outer periphery of said groove; and radially extending passageways in said hubs connecting said axial holes with said disks.

5. The combination as set out in claim 4 wherein the radial distance from the axis of the clutch hubs to the inner periphery of said labyrinth seal is less than the radial distance from the axis of the clutch hubs to the outer periphery of the axial holes in said second hub.

6. In combination with a power transmitting mechanism including a housing partially filled with a lubricating oil, a wall dividing the housing into a gear chamber and a clutch chamber, an opening through said wall beneath the level of said lubricating oil to allow the flow of oil between said clutch and gear chambers, a pair of axially aligned shafts journaled for rotation within the housing, a gear set operatively connected to one of the shafts within the gear chamber and having a portion thereof partially submerged in the lubricating oil whereby said lubricating oil is splashed upon rotation of said gear set, and a friction clutch operatively connected to the shafts within the clutch chamber for selective connection of the shafts in torque transmitting relation, a means for delivering oil splashed by the gear set to the clutch comprising: a tube having a diverging flange at one end thereof; a mounting surface connected to said flange describing a plane at right angles to the axis of said tube, said mounting surface being fastened in oil sealing relation to said wall within said clutch chamber and said tube encircling said one of said shafts from said wall to said clutch; a baffle having one end connected to said flange and forming with said mounting surface an oil carrying passageway in communication with said tube, the other and relatively higher end of said baffle extending into said gear chamber and overlying said gear set; and a coil spring of a length substantially equal to the length of said tube attached to said one of said shafts for rotation therewith within said tube.

References Cited in the file of this patent

UNITED STATES PATENTS

| | | |
|---|---|---|
| 1,686,271 | George | Oct. 2, 1928 |
| 2,441,937 | Kessler | May 18, 1948 |
| 2,441,942 | Van Ness | May 18, 1948 |

FOREIGN PATENTS

| | | |
|---|---|---|
| 150,301 | Great Britain | Oct. 7, 1920 |
| 718,161 | Germany | Mar. 2, 1942 |
| 590,867 | Great Britain | July 30, 1947 |
| 730,422 | Great Britain | May 25, 1955 |